US005805007A

United States Patent [19]

Colli

[11] Patent Number: 5,805,007

[45] Date of Patent: Sep. 8, 1998

[54] LOW-POWER, LOW-VOLTAGE FOUR-QUADRANT ANALOG MULTIPLIER, PARTICULARLY FOR NEURAL APPLICATIONS

[75] Inventor: Gianluca Colli, Santa Clara, Calif.

[73] Assignee: SGS-Thomson Microelectronics S.r.l., Agrate Brianza, Italy

[21] Appl. No.: 721,870

[22] Filed: Sep. 27, 1996

[30] Foreign Application Priority Data

Sep. 27, 1995 [EP] European Pat. Off. .............. 95830398

[51] Int. Cl.$^{6}$ ................................ G06F 7/44; G06G 7/16

[52] U.S. Cl. ........................... 327/356; 327/357; 327/119

[58] Field of Search .................................... 327/355–359, 327/105, 113, 116, 118, 119, 120

[56] References Cited

U.S. PATENT DOCUMENTS

| | | | |
|---|---|---|---|
| 3,956,643 | 5/1976 | Hite | 327/357 |
| 5,061,866 | 10/1991 | El-Naggar et al. | 307/529 |
| 5,519,811 | 5/1996 | Yoneda et al. | 395/24 |
| 5,563,819 | 10/1996 | Nelson | 364/825 |
| 5,578,965 | 11/1996 | Kimura | 327/357 |
| 5,587,682 | 12/1996 | Colli et al. | 327/357 |
| 5,630,228 | 5/1997 | Mittel | 455/326 |

FOREIGN PATENT DOCUMENTS 2261093 5/1993 United Kingdom .

OTHER PUBLICATIONS

Liu, S.I., "Low Voltage CMOS Four–Quadrant Multiplier," *Electronics Letter*, vol. 30, No. 25, Dec. 8, 1994, pp. 2125–2126.

*Primary Examiner*—Timothy P. Callahan
*Assistant Examiner*—T. T. Lam
*Attorney, Agent, or Firm*—David V. Carlson; Robert Iannucci

[57] ABSTRACT

A multiplier presenting four multiplying branches, each formed by a buffer transistor and by two input transistors arranged in series to one another and connected between two output nodes and a common node. A biasing branch presents a diode-connected forcing transistor with its gate terminal connected to the gate terminal of all the buffer transistors, and its source terminal connected to the common node. The forcing transistor forces the input transistors to operate in the triode (linear) region, i.e., as voltage-controlled resistors, so that they conduct a current linearly proportional to the voltage drop between the respective source and gate terminals, and the currents through the output nodes are proportional to the input voltages applied to the control terminals of the input transistors. By cross-coupling the multiplying branches to the output nodes and subtracting the two output currents, a current is obtained which is proportional to the product of the two input voltages.

29 Claims, 3 Drawing Sheets

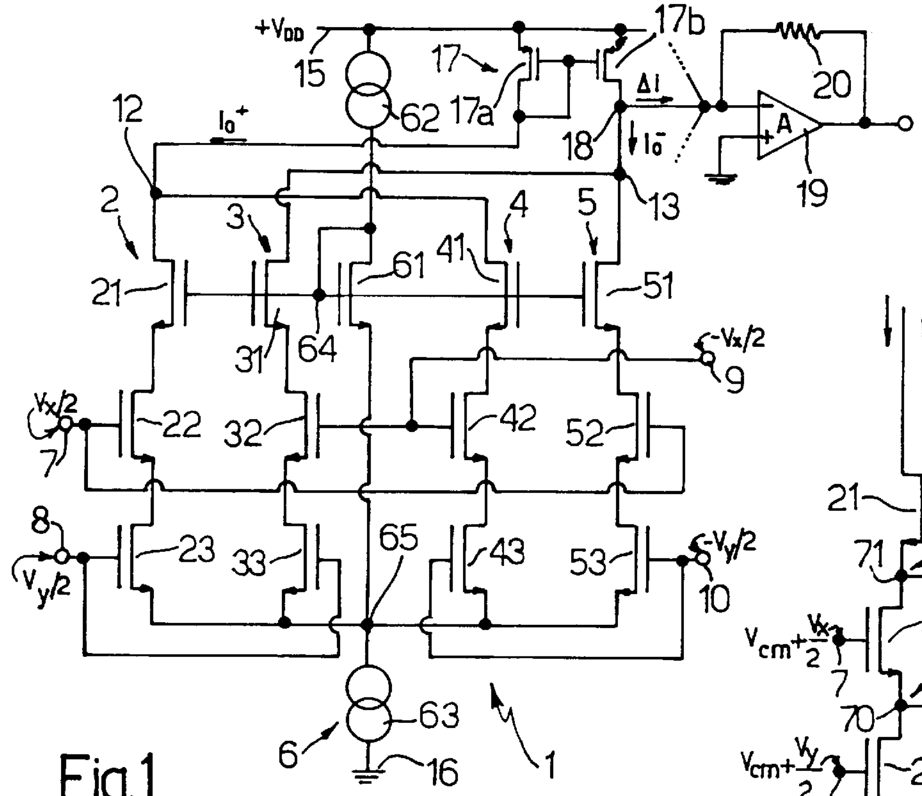
Fig.1
Fig.2
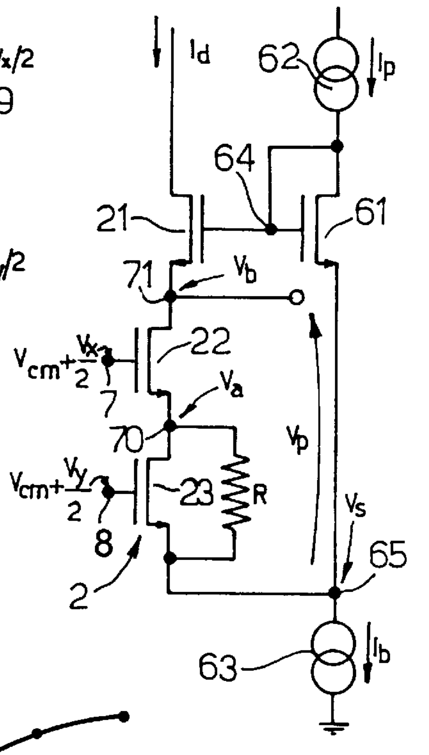
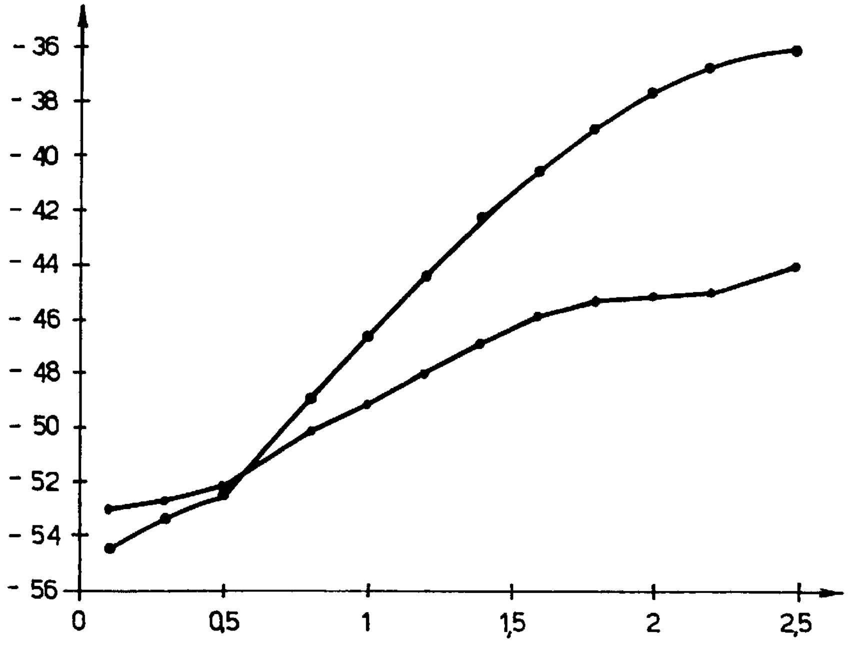
Fig. 4

LOW-POWER, LOW-VOLTAGE FOUR-QUADRANT ANALOG MULTIPLIER, PARTICULARLY FOR NEURAL APPLICATIONS

TECHNICAL FIELD

The present invention relates to a low-power, low-voltage analog multiplier, particularly for neural applications.

BACKGROUND OF THE INVENTION

As is known, four-quadrant analog multipliers are a basic element in the construction of audio and video signal processing systems, particularly as regards signal reception and transmission, and in the construction of adaptive filters such as correlators and convolvers.

Recently, they have also been applied to the hardware construction of complex neural architectures requiring an analog multiplier (in this case, known as a synapse) as the basic element.

Architectures such as Hopfield networks, multilayer perceptra and Kohonen maps make extensive use of analog multipliers, which may also be used to advantage in hand- or typewritten character recognition systems, self-teaching associative memories, image processing modules and texture analysing systems.

SUMMARY OF THE INVENTION

In view of the high parallel computing capacity and hence the large number of single multiplying cells required by the neural networks in which they are employed, the current demand is for analog multipliers occupying a small integration area, presenting a good degree of modularity, and, above all, provide for low power dissipation per cell.

Various embodiments are to be found in literature of integrated circuits implementing the four-quadrant analog multiplying function. Some known solutions are based on a variation in the transconductance of differential stages (e.g. Gilbert cells) or on the use of transconductors (see, for example, "A precise Four-Quadrant Multiplier with Subnonosecond Response", B. Gilbert, IEEE Journal Solid State Circuits, Vol. SC-3, p. 365–373, Dec. 68; "A 20 V Four-Quadrant CMOS Analog Multiplier", J. N. Babanezhad, G. C. Tems, IEEE Journal Solid State Circuits, Vol. SC-20, No 6, Dec. 1985; "A CMOS Four-Quadrant Analog Multiplier with Single-Ended Voltage Output and Improved Temperature Performance", Z. Wang, IEEE Journal Solid State Circuits, Vol. SC-26, No 9, Sept. 1991; "A ±5 V CMOS Analog Multiplier", Shi-Cai Qin, Randy L. Geiger, IEEE Journal Solid State Circuits, Vol. SC-22, No 6, Dec. 1987).

Other known solutions are based on hardware implementation of the algebraic equation:

$$4\,V_aV_b=(V_a+V_b)^2-(V_a-V_b)^2$$

using the quadratic characteristic I/V of a MOS transistor (see, for example, "An MOS Four-Quadrant Analog Multiplier using Simple Two-Input Squaring Circuits with Source Followers", Ho-Jun Song, Choong-Ki Kim, IEEE Journal Solid State Circuits, Vol. SC-25, No 3, June 1990; "A MOS Four-Quadrant Analog Multiplier using the Quarter-Square Technique", J. S. Pena-Finol, J. A. Connely, IEEE Journal Solid State Circuits, Vol. SC-22, No 6, Dec. 1987).

When formed using the bipolar technique, solutions based on traditional Gilbert cells present a limited input voltage range and high power dissipation (50 mW or more, depending on the desired frequency performance and input voltage range), require a high supply voltage (+5V to −5V), and occupy a large area. Improvements employing CMOS transistors provide for reducing power dissipation and supply, but nevertheless require a minimum supply voltage of 5 V and still occupy a generally large area.

With a high input voltage range and high output linearity, solutions employing the quadratic characteristic of MOS transistors require a large area and involve high power dissipation, so that neither solution is suitable for use as a synapse in neural networks.

It is an object of the present invention to provide an analog multiplier of the above type, designed to overcome the drawbacks typically associated with known devices, and which in particular provides for a high input voltage range and low supply voltage and power dissipation, and is of compact size.

According to the present invention, there is provided a low-power, low-voltage, four-quadrant analog multiplier for use in many applications, including neural networks, frequency doubler, or amplitude modulator.

BRIEF DESCRIPTION OF THE DRAWINGS

A preferred, non-limiting embodiment of the present invention will be described by way of example with reference to the accompanying drawings, in which:

FIG. 1 shows a circuit diagram of the analog multiplier according to the present invention;

FIG. 2 shows a circuit diagram of part of the FIG. 1 multiplier;

FIG. 4 shows a graph of total harmonic distortion as a function of input voltage.

DETAILED DESCRIPTION OF THE INVENTION

Figure 3A:
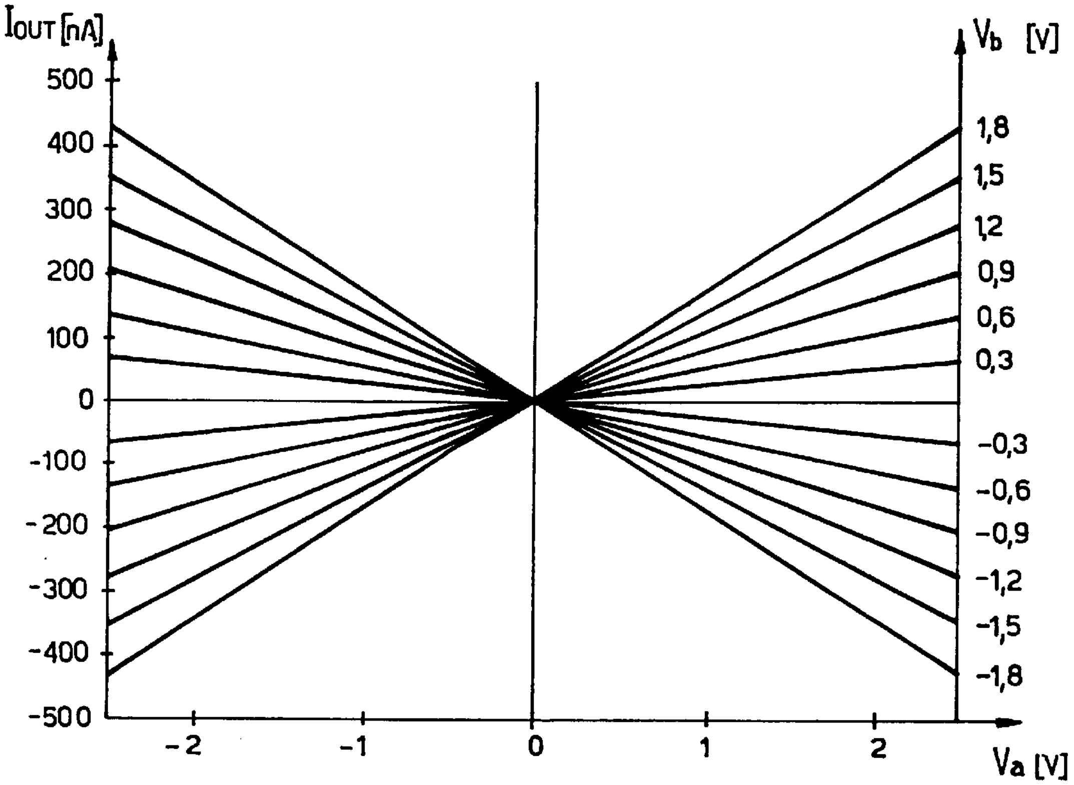
FIGS. 3*a* and 3*b* show the DC characteristic of the multiplier as represented by the output current as a function of one of the two input voltages, and using the other input voltage as a parameter.

FIG. 1 shows a multiplying cell 1 forming the analog multiplier according to the invention. Cell 1 comprises four identical multiplying branches 2, 3, 4, 5 connected to four input terminals 7, 8, 9, 10 and to two output nodes 12, 13; a biasing branch 6 interposed between a supply line 15 at VDD and a ground line 16, and connected to multiplying branches 2–5 as described below; and a subtracting circuit 17 connected to nodes 12, 13. Input terminals 7–10 are supplied with the two voltages $V_x$, $V_y$ to be multiplied, and which are supplied differentially so that input terminal 7 presents voltage $+V_x/2$ with respect to ground, terminal 8 presents voltage $+V_y/2$, terminal 9 presents voltage $-V_x/2$, and terminal 10 presents voltage $-V_y/2$.

Biasing branch 6 comprises a diode-connected N-channel MOS forcing transistor 61, the drain terminal of which is connected to supply line 15 via a first biasing current source 62 supplying current $I_p$, the source terminal of which defines a node 65 and is grounded via a second biasing current source 63 (supplying current $I_b$), and the gate terminal of which defines a node 64.

Multiplying branches 2–5 each comprise, respectively, a buffer transistor 21, 31, 41, 51, a first input transistor 22, 32, 42, 52, and a second input transistor 23, 33, 43, 53, all of which are N-channel MOS types, and the three transistors of each branch are pipelined between nodes 12, 13 and node 65 of biasing branch 6.

More specifically, buffer transistor 21 of the first multiplying branch 2 has its drain terminal connected to node 12, its gate terminal connected to node 64, and its source terminal connected to the drain terminal of transistor 22; first input transistor 22 of branch 2 has its gate terminal connected to input terminal 7, and its source terminal connected to the drain terminal of transistor 23; and second input transistor 23 of branch 2 has its gate terminal connected to input terminal 8, and its source terminal connected to node 65.

Buffer transistor 31 of the second multiplying branch 3 has its drain terminal connected to node 13, its gate terminal connected to node 64, and its source terminal connected to the drain terminal of transistor 32; first input transistor 32 of branch 3 has its gate terminal connected to input terminal 9, and its source terminal connected to the drain terminal of transistor 33; and second input transistor 33 of branch 3 has its gate terminal connected to input terminal 8, and its source terminal connected to node 65.

Buffer transistor 41 of the third multiplying branch 4 has its drain terminal connected to node 12, its gate terminal connected to node 64, and its source terminal connected to the drain terminal of transistor 42; first input transistor 42 of branch 4 has its gate terminal connected to input terminal 9, and its source terminal connected to the drain terminal of transistor 43; and second input transistor 43 of branch 4 has its gate terminal connected to input terminal 10, and its source terminal connected to node 65.

Buffer transistor 51 of the fourth multiplying branch 5 has its drain terminal connected to node 13, its gate terminal connected to node 64, and its source terminal connected to the drain terminal of transistor 52; first input transistor 52 of branch 5 has its gate terminal connected to input terminal 7, and its source terminal connected to the drain terminal of transistor 53; and second input transistor 53 of branch 5 has its gate terminal connected to input terminal 10, and its source terminal connected to node 65.

Subtracting circuit 17 is a 1:1 current mirror comprising a first and a second PMOS transistors 17*a*, 17*b*. More specifically, transistor 17*a* has its source terminal connected to supply line 15, its drain terminal connected to node 12, and its gate terminal connected to its own drain terminal (diode connection) and to the gate terminal of transistor 17*b*, which has its source terminal connected to supply line 15, and its drain terminal connected to node 13. For the sake of clarity, FIG. 1 also shows an intermediate node 18 between the drain terminal of transistor 17*b* and node 13, and at which the current $I_o^+$ through transistor 17*b* (which mirrors the current in transistor 17*a* towards node 12) and the current $I_o^-$ entering node 13 towards branches 3 and 5 are subtracted, so that node 18 supplies a current ΔI equal to the difference between currents $I_o^+$ and $I_o^-$. FIG. 1 also shows an operational amplifier 19 for adding the currents ΔI of a number of multiplying cells similar to cell 1. More specifically, operational amplifier 19 has its noninverting input grounded, its output feedback connected to the inverting input via a resistor 20, and its inverting input connected to node 18 of all the multiplying cells 1.

Multiplying cell 1 in FIG. 1 operates as follows. Forcing transistor 61 of biasing branch 6 operates as a diode and imposes a predetermined voltage drop between nodes 64 and 65 to force input transistors 22, 23; 32, 33; 42, 43; 52, 53 to operate in the triode (linear) region, i.e. as voltage-controlled resistors, so that they conduct a current linearly proportional to the voltage drop between the source and gate terminals. The buffer transistor 21, 31, 41, 51 of each multiplying branch is so sized as to operate in subthreshold mode (as is obvious to any technician in the field, given the current range of a transistor, the width/length W/L ratio may be so sized that the gate-source voltage drop is approximately equal to the threshold voltage) to minimise (practically eliminate) its overdrive voltage (i.e. the difference between the gate-source voltage drop and the threshold voltage of the transistor) so that the buffer transistor of each multiplying branch operates as a current buffer with improved performance as compared with devices operating in saturation mode.

While in one preferred embodiment, as discussed above, the buffer transistor 21, in the embodiment of FIG. 2 and, for the embodiment of FIG. 1 also the 31, 41, 51 are sized so as to operate in the subthreshold mode, there is an alternative embodiment in which the transistor sizing is selected to operate these transistors in either the linear mode or the saturation mode. In a further alternative embodiment, the voltage at node 64 is increased such that the transistor 21, and, if present in the circuit, transistors 31, 41 and 51 operate in either the linear mode or the saturation mode.

Accordingly, in one alternative embodiment transistor 21 is operated in the saturation mode, this being accomplished either by proper sizing of transistor 21 or alternatively by raising the bias voltage on node 64 to increase the drain current through transistor 21. Transistor 61 remains connected to node 64 and will still operate in the diode node. Therefore, transistors 22 and 23 will still operate in the linear mode, which is also called the triode region. By suitably dimensioning the input transistors 22, 23, 32, 33, etc., and current buffers 21, 31, the bias current is selected to provide good frequency behavior of the circuit so that it has the appropriate response time.

The total drain-source voltage drop of the two input transistors of each multiplying branch 2–5 is determined by the overdrive voltage (drain-source voltage drop minus threshold voltage) of forcing transistor 61, which in turn is determined by the biasing current set by current sources 62, 63, so that the drain-source voltage $V_{ds}$ of the input transistors is maintained below the corresponding overdrive voltage to ensure operation of the transistors in the linear region.

To increase the dynamic range of the input transistors, they are so sized that the channel length is greater than the width.

Operation of multiplying cell 1 is thus based on self-modulation of the drain-source voltage of the input transistors operating in the linear region, to obtain a variation in the equivalent transconductance of each branch, so that the output current of each current buffer depends on both the input voltages. Nonlinearity of the second and third order is eliminated or at any rate made negligible by cross-coupling the output.

For a clear understanding of the operation of multiplying cell 1, reference will first be made to FIG. 2, which shows multiplying branch 2 only and biasing branch 6, and in which the gate terminals of transistors 22, 23 are indicated as presenting respective voltages $(V_x/2+V_{cm})$ and $(V_y/2+V_{cm})$, the sum of the voltages in FIG. 1 plus the common mode voltage $V_{cm}$ which, in the FIG. 1 differential circuit, is rejected.

As is known, the drain current $I_d$ of an NMOS transistor operating in the linear region is given by the equation:

$$I_d = \text{Cost} \cdot \left[ (V_{gs} - V_{th}) \cdot V_{ds} - \frac{V_{ds}^2}{2} \right] \tag{1}$$

where Cost, $V_{gs}$, $V_{th}$ and $V_{ds}$ are respectively a constant defining the transconductance parameter, the gate-source voltage drop, the threshold voltage (gate-source voltage above which the transistor is turned on), and the drain-source voltage drop.

In the case in question, the drain-source voltage drop of transistors 22, 23 is determined by the gate-source voltage drop of forcing transistor 61, and is roughly twenty times less than the $(V_{gs}-V_{th})$ term, i.e. the overdrive of transistors 22, 23, so that, for transistors 22, 23, the second term of (1) may be disregarded to give:

$$I_d = \text{Cost} \cdot (V_{gs} - V_{th}) \cdot V_{ds} \tag{1'}$$

Moreover, if $V_a$ is the voltage with respect to ground at node 70 between the source terminal of transistor 22 and the drain terminal of transistor 23; $V_b$ the voltage with respect to ground at node 71 between the source terminal of buffer transistor 21 and the drain terminal of transistor 22; $V_p$ the voltage between nodes 71 and 65; $V_s$ the voltage with respect to ground at node 65; and R the equivalent resistance of transistor 23 (operating, as stated, in the linear region) equal to the ratio between the drain-source voltage drop $V_{ds}$ and the current $I_d$ of transistor 23, then (1') gives, for transistor 22:

$$I_d = K_{22} \cdot \left[ \left( V_{cm} + \frac{V_x}{2} - V_{th} - V_a \right) \cdot (V_b - V_a) \right] \tag{2}$$

and, for transistor 23:

$$R = \frac{V_{ds}}{I_d} = \frac{1}{K_{23} \cdot \left( \frac{V_y}{2} + V_{cm} - V_s - V_{th} \right)} \tag{3}$$

where $K_{22}$ and $K_{23}$ represent the value of the constant Cost for transistors 22 and 23, and:

$$V_a = I_d R + V_s$$

$$V_b = V_p + V_s.$$

Moreover, bearing in mind that the gate-source voltage drop of transistor 61 (operating in saturation mode) equals threshold voltage $V_{th}$ plus overdrive voltage $V_{ov}$, and that buffer transistor 21 operates in subthreshold mode, i.e. with a gate-source voltage drop roughly equal to threshold voltage $V_{th}$, and assuming the threshold voltage is roughly equal for all the transistors, the following equation applies:

$$V_{gs,61} = V_{ov,61} + V_{th} = V_p + V_{gs,21} \cong V_p + V_{th}$$

so that $$V_p \cong V_{ov,61} \tag{4}$$

where $V_{gs,61}$, $V_{ov,61}$ and $V_{gs,21}$ are respectively the gate-source voltage drop of transistor 61, the overdrive voltage of transistor 61, and the gate-source voltage drop of transistor 21.

Bearing in mind that the current of a saturated MOS transistor is proportional to the square of the overdrive voltage ($I=KV_{ov}^2$), equation (4) for transistor 61 gives:

$$V_p = \sqrt{\frac{I_p}{K_d}} \tag{5}$$

where $K_d$ is a multiplication constant, and $I_p$ the current in transistor 61 (current of source 62).

Combining equations (1'), (2) and (3), the current $I_d$ in branch 2 equals:

$$I_d = K2 \cdot \frac{\left( V_{cm} + \frac{V_x}{2} - V_{th} - V_s \right)}{1 + \frac{K_2 \cdot \left( V_{cm} + \frac{V_x}{2} - V_{th} - V_s \right)}{K_3 \cdot \left( V_{cm} + \frac{V_y}{2} - V_{th} - V_s \right)}} \cdot V_p \tag{6}$$

Making the necessary simplifications, and assuming $K_{22}=K_{23}=K$ (i.e. the transconductance parameter is the same for both transistors 22, 23) and $V_d=V_{cm}-V_{th}-V_s$=constant, equation (6) gives the four currents in branches 2, 3, 4 and 5:

$$I\left( \frac{V_x}{2}, \frac{V_y}{2} \right) = K \frac{\left( \frac{V_x}{2} + V_d \right) \cdot \left( \frac{V_y}{2} + V_d \right)}{2 \cdot V_d + \left( \frac{V_x}{2} + \frac{V_y}{2} \right)} \cdot V_p \tag{7}$$

$$I\left( -\frac{V_x}{2}, +\frac{V_y}{2} \right) = K \frac{\left( -\frac{V_x}{2} + V_d \right) \cdot \left( \frac{V_y}{2} + V_d \right)}{2 \cdot V_d + \left( -\frac{V_x}{2} + \frac{V_y}{2} \right)} \cdot V_p \tag{8}$$

$$I\left( -\frac{V_x}{2}, -\frac{V_y}{2} \right) = K \frac{\left( -\frac{V_x}{2} + V_d \right) \cdot \left( -\frac{V_y}{2} + V_d \right)}{2 \cdot V_d + \left( -\frac{V_x}{2} - \frac{V_y}{2} \right)} \cdot V_p \tag{9}$$

$$I\left( \frac{V_x}{2}, -\frac{V_y}{2} \right) = K \frac{\left( \frac{V_x}{2} + V_d \right) \cdot \left( -\frac{V_y}{2} + V_d \right)}{2 \cdot V_d + \left( \frac{V_x}{2} - \frac{V_y}{2} \right)} \cdot V_p \tag{10}$$

The current $I_o^+$ is the sum of the currents through branches 2 and 4 and the current $I_o^-$ is the sum of the current through branches 3 and 5. The difference between the output currents $\Delta I=I_o^+-I_o^-$ is given by the equation:

$$\Delta I = \left[ I\left( \frac{V_x}{2}, \frac{V_y}{2} \right) + I\left( -\frac{V_x}{2}, -\frac{V_y}{2} \right) \right] - \left[ I\left( -\frac{V_x}{2}, \frac{V_y}{2} \right) + I\left( \frac{V_x}{2}, -\frac{V_y}{2} \right) \right] \tag{11}$$

Substituting equations (7), (8), (9) and (10) in (11) gives:

$$\Delta I = K \cdot V_p \cdot \frac{16 \cdot V_d^3 - 8 \cdot V_d \cdot (V_x^2 + V_y^2)}{64 \cdot V_d^4 - 32 \cdot V_d^2 \cdot (V_x^2 + V_y^2) + (V_x^2 - V_y^2)^2} \cdot (V_x \cdot V_y) \tag{12}$$

We assume that $V_d$ is a very small voltage and thus $V_d^2$ and $V_d^4$ are also very small. In view of the fact that:

$$32 \cdot V_d^2 \cdot (V_x^2 + V_y^2) >> (V_x^2 - V_y^2)^2 \tag{13}$$

applies for each $V_x$ and $V_y$ in the respective input voltage range, a few calculations give:

$$\Delta I = K \cdot \frac{\sqrt{\frac{I_p}{K_d}}}{4 \cdot (V_{cm} - V_{th} - V_s)} \cdot (V_x \cdot V_y) \quad (14)$$

which demonstrates the multiplying function of the FIG. 1 circuit.

The proposed circuit has been simulated using the simulator ELDO version 4.1 with LEVEL3 models. The device sizes and bias condition are shown in Table 1.

It is assumed that n-ch low threshold devices are used.

Figure 3B:
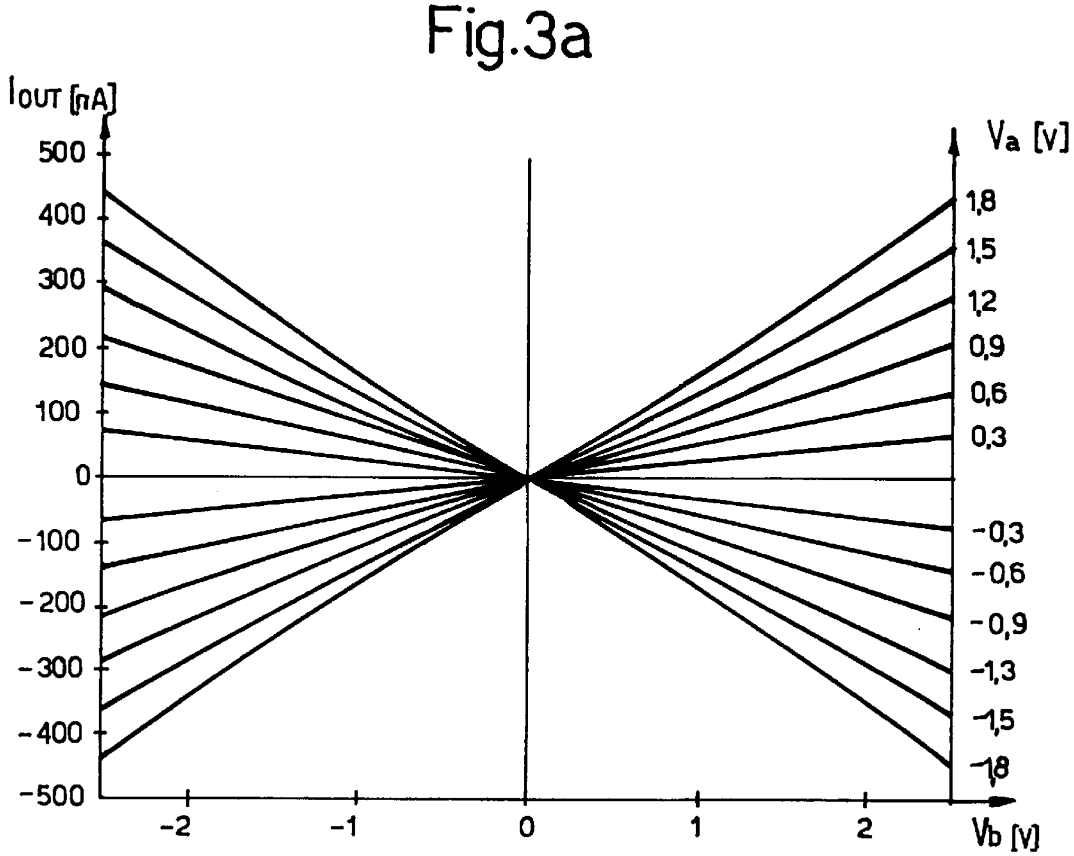

FIGS. 3*a*, 3*b* and 4 show a number of simulations of the FIG. 1 circuit. In particular, FIG. 3*a* shows the DC transfer characteristic of the multiplier as represented by the output current ΔI as a function of $V_x$ in the −2.5 to 2.5 V range, with $V_y$ as a parameter (of predetermined value); similarly, FIG. 3*b* shows the output current ΔI as a function of $V_y$ with $V_x$ as a parameter (of predetermined value); and FIG. 4 shows total harmonic distortion (THD) as a function of a 1.2 V sinusoidal input voltage, and varying the other differential input (DC) in the 0 to 2.5 V range.

Figure 5:
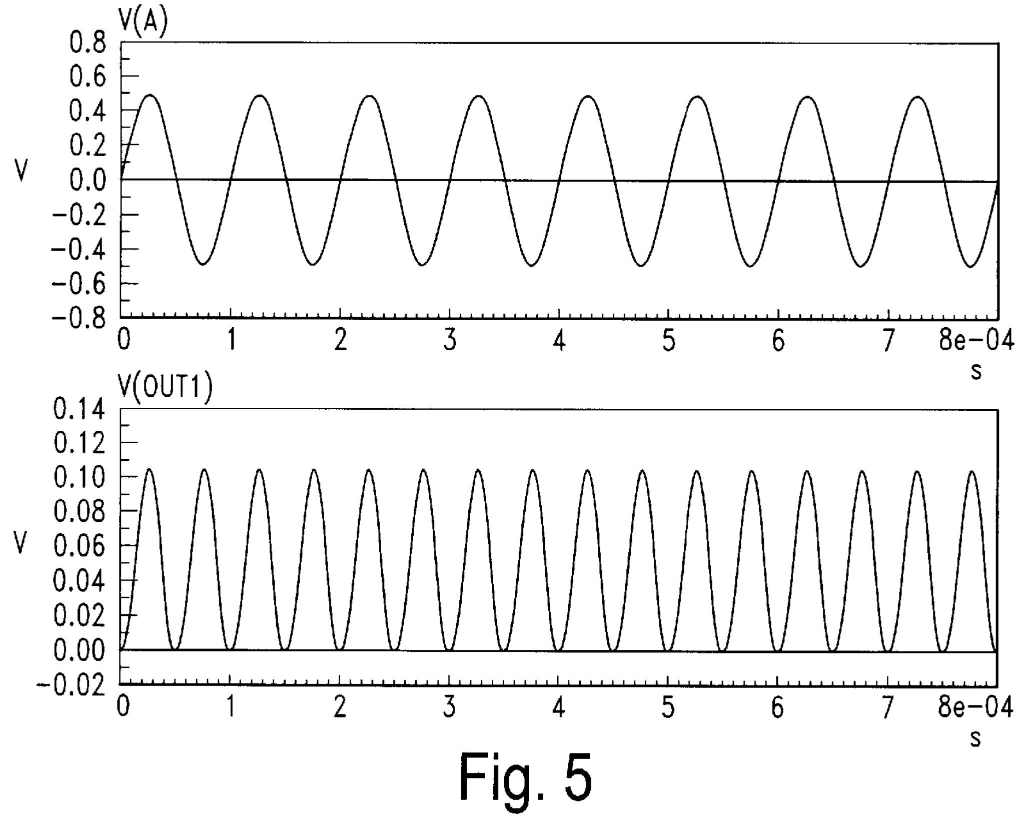
FIG. 5 shows the performance of the multiplier as a frequency doubler.
Figure 6:
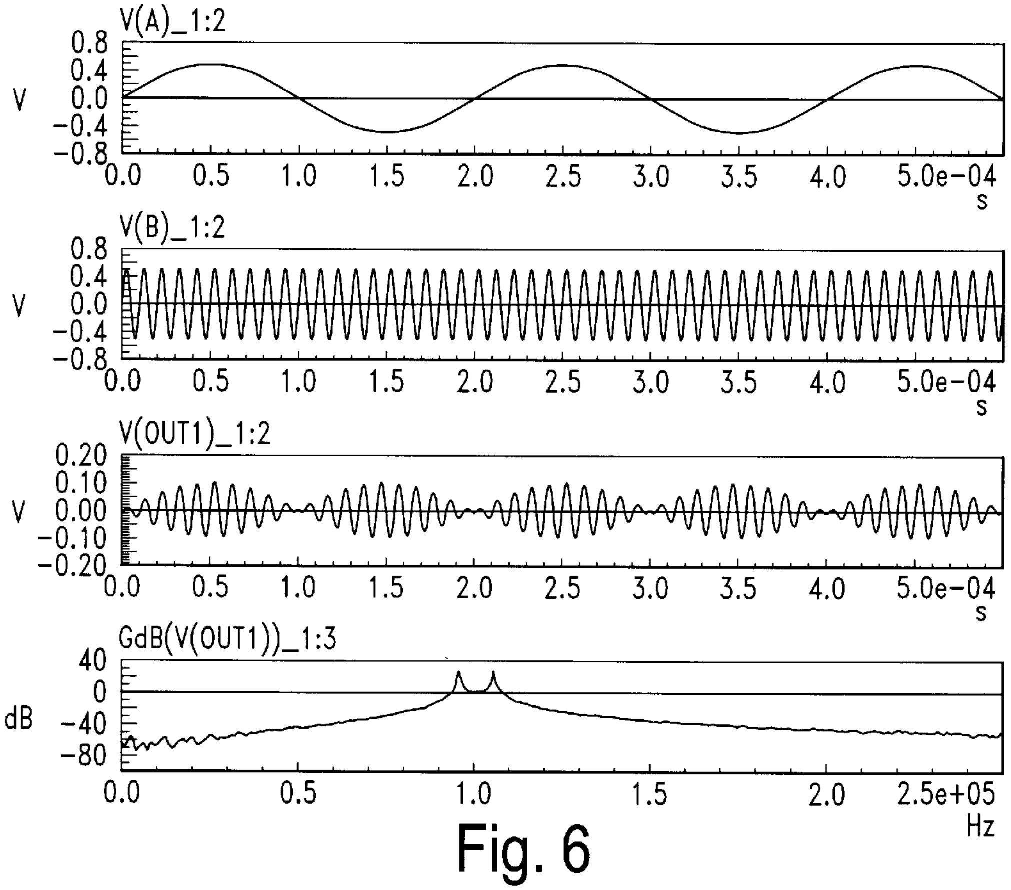
FIG. 6 shows the performance of the multiplier as an amplitude modulator.

FIG. 5 shows the simulation of the performance of the multiplier as a frequency doubler. The input signals are two in-phase 10 kHz sine wave of 0.5 Vpp and the output is a sine wave of twice of input frequency. FIG. 6 demonstrates the use of the multiplier as an amplitude modulator: in the simulation a 5 kHz sine wave is modulated by a 100 kHz sine wave. Also, the simulated spectrum of the output signal is given. All these simulations have been done using a circuit bias with real current mirror. In conclusion, in Table 2, all the simulated performances of the new four quadrant analog multiplier are summarized.

TABLE 1

| Bias Conditions and Device Size | |
|---|---|
| **Bias Conditions** | |
| Vsupply | 1.5Vpp |
| Ib | 3.5 μA |
| Ip | 500nA |
| **Device Size** | |
| 22, 23; 32, 33; 42, 43; 52, 53 | 2.5/30 |
| 21,31,41,51 | 30/1 |
| 61 | 5/5 |
| MIp | 30.8/5 |
| MIb | 10/2 |

TABLE 2

| Performance<br>Performance of the Muitiplier | |
|---|---|
| Power Dissipated | 6 μW |
| Vsupply | 1.5 V |
| Area for cell | 94 μm x 64 μm |
| Input Voltage Range | −2.5–2.5 Vpp |
| THD (at 200kHz) | −40 dB |
| Bandwidth for Vx and Vy | 600 kHz |
| Output Range (in current) | 0–500nA |

The advantages of the multiplier according to the present invention are as follows. Firstly, it provides for a wide input voltage range by virtue of employing MOS transistors operating in the triode region. Secondly, it is capable of operating with low supply voltages. Though typically designed to operate with a supply voltage $V_{DD}$ of 3 V, it can also operate with a $V_{DD}$ of as low as 1.5 V, thanks to the presence of a small number of pipelined transistors in each branch, and to the fact that two of these operate in the linear region. Thirdly, it provides for very low power dissipation (6 μW with 1.5 V supply), and for harmonic distortion of less than 1% at both inputs with maximum peak-peak voltages in relation to the possible input voltage range. (THD is less than 40 db for one input at 1.5 V peak-to-peak at 200 kHz and the other at 1.2 V DC.) Fourthly, it presents an extremely simple configuration, and requires a very small area (cell 1 measures only 95×64 μm).

Accordingly, broadly stated, the invention makes use of two transistors connected in series which operate in the triode mode. A biasing circuit is provided which forces the transistors to operate in the linear or triode mode. When a voltage is applied to transistor 22, the effective resistance of transistor 23 is correspondingly modulated by the input voltage on transistor 22. The same is true of an input voltage provided to transistor 23 and its effect on transistor 22. The drain current of transistor 23 will therefore be proportional to the product of the two input voltages on the respective two input terminals of transistors 22 and 23. The value of the input voltages are independent of each other. The drain current $I_d$ therefore is proportional to the product of two independent input voltages, providing a low-power, low-current analog multiplier.

Changes may be made to the circuit as described and illustrated herein without, however, departing from the scope of the present invention, the invention being limited only by the claims and not by the detailed description herein.

I claim:

1. An analog multiplier comprising:

a first multiplying branch including first and second transistors, said first and second transistors being MOS transistors arranged in series to each other, the first multiplying branch having first and second input terminals respectively receiving first and second input voltages;

an output terminal supplying an electric output quantity proportional to the product of said first and second input voltages; and biasing means connected to said first and second transistors and forcing said first and second transistors to operate in a triode region.

2. A multiplier as claimed in claim 1, characterised in that said biasing means comprise a diode-connected third transistor.

3. A multiplier as claimed in claim 2, characterised in that said third transistor is a MOS transistor.

4. A multiplier as claimed in claim 2 wherein said first and second transistors each include first and second terminals and said third transistor includes first, second, and control terminals; characterised in that the first terminal of said first transistor is coupled to the control and second terminals of said third transistor; the second terminal of said first transistor is connected to the first terminal of said second transistor; and the second terminal of said second transistor is connected to the first terminal of said third transistor.

5. A multiplier as claimed in claim 1, further including a buffer transistor connected in series to said first and second transistors and interposed between said first transistor and said output terminal of the multiplier, the buffer transistor being coupled to the biasing means.

6. A multiplier as claimed in claim 5 wherein said buffer transistor has its control terminal connected to said biasing means; said biasing means comprising means for forcing said buffer transistor to operate in a subthreshold region.

7. A multiplier as claimed in claim 5 wherein said first transistor includes a first terminal; said biasing means includes a third transistor with a control terminal; said buffer transistor has first, second, and control terminals; said control terminal of said third transistor being connected to the control terminal of said buffer transistor; said first terminal of said buffer transistor being connected to said output terminal; and said second terminal of said buffer transistor being connected to said first terminal of said first transistor.

8. A multiplier as claimed in claim 7 wherein said first, second and third transistors and said buffer transistor are N-channel MOS transistors.

9. A multiplier as claimed in claim 1, further including a second, a third and a fourth multiplying branch, each comprising a respective first and a respective second MOS transistor arranged in series to each other; wherein the multiplier also comprises a third and a fourth input terminal, said first input voltage being applied between said first and said third input terminal, and said second input voltage being applied between said second and said fourth input terminal; and wherein said first MOS transistors of said first and fourth multiplying branches each include a control terminal connected to said first input terminal; said first MOS transistors of said second and third multiplying branches each include a control terminal connected to said third input terminal; said second transistors of said first and second multiplying branches each include a control terminal connected to said second input terminal; and said second MOS transistors of said third and fourth multiplying branches each include a control terminal connected to said fourth input terminal.

10. A multiplier as claimed in claim 9, further including a first and a second output node and a common node, said first and second output nodes being coupled to said output terminal; said second MOS transistors of said first, second, third and fourth multiplying branches each having a first terminal connected to said common node; said first MOS transistors of said first and third multiplying branches having respective second terminals connected together and to said first output node; and said first MOS transistors of said second and fourth multiplying branches having respective second terminals connected to said second output node.

11. A multiplier as claimed in claim 10, further including a subtracting circuit having a first and second input connected to said first and second output nodes, and an output connected to said output terminal.

12. A multiplier as claimed in claim 11 wherein said subtracting circuit comprises a current mirror.

13. A multiplier as claimed in claim 12 wherein current mirror comprises P-channel MOS transistors.

14. An analog multiplier comprising:

a first and second transistors connected in series with each other, each having a first, a second and an input terminal wherein said second terminal of said second transistor is coupled to a ground;

a control circuit coupled to said transistors to ensure operation of said transistors in a triode region during operation;

a first input voltage connected to the input terminal of said first transistor and a second input voltage connected to the input terminal of said second transistor such that an output current flowing from said transistors to an output terminal coupled to said first terminal of the first transistor is proportionate to the product of the first and second input voltages.

15. The analog multiplier of claim 14, wherein said control circuit includes biasing means wherein a first terminal of said biasing means is connected to the first terminal of said first transistor and a second terminal of said biasing means is connected to the second terminal of said second transistor, the second terminal of said first transistor is connected to the first terminal of said second transistor, and said biasing means forces said first and second transistors to operate in the triode region.

16. The analog multiplier according to claim 15 wherein said biasing means includes:

a buffer transistor having first, second, and control terminals and being connected in series to said first transistor, wherein the first terminal of said buffer transistor is connected to the output terminal and the second terminal of said buffer transistor is connected to the first terminal of said first transistor; and a diode-connected transistor having a first, a second and a control terminals, wherein the first terminal and the control terminal of said diode-connected transistor are connected together, the control terminal of said diode-connected transistor being further connected to the control terminal of said buffer transistor, the first terminal of said diode-connected transistor being connected to a first current source, the second terminal of said diode-connected transistor being connected to a second current source, and the second terminal of said diode-connected transistor being further connected to the second terminal of said second transistor.

17. The analog multiplier of claim 14 wherein the first and second transistors are included in a first multiplying branch the analog multiplier further comprising:

a second multiplying branch having first and second transistors connected in series and operated in the triode region, each transistor of the second multiplying branch having a first, a second and a control terminal;

a third multiplying branch having first and second transistors connected in series and operated in the triode region, each transistor of the third multiplying branch having first, second, and control terminals;

a fourth multiplying branch having first and second transistors connected in series and operated in the triode region, each transistor of the fourth multiplying branch having first, second, and control terminals, wherein the control terminal of the first transistor of said fourth multiplying branch is connected to the input terminal of the first transistor of said first multiplying branch, the control terminal of the second transistor of said fourth multiplying branch being connected to the control terminal of the second transistor of said third multiplying branch, the control terminal of the first transistor of said second multiplying branch being connected to the control terminal of the first transistor of said third multiplying branch, the control terminal of the second transistor of said second multiplying branch being connected to the input terminal of the second transistor of the first multiplying branch, the input terminal of the first transistor of said first multiplying branch connected to the first input voltage, the input terminal of the second transistor of said first multiplying branch connected to the second input voltage, the control terminal of the first transistor of said second multiplying branch connected to a third input voltage, the control terminal of the second transistor of said fourth multiplying branch connected to a fourth input voltage, the second terminals of the second transistors in all four branches being connected together.

18. The analog multiplier of claim 17, wherein said control circuit includes:

biasing means, wherein a first terminal of said biasing means is connected to the first terminals of said first transistors of all said four branches and a second terminal of said biasing means is connected to the second terminals of said second transistors of all said four branches, said biasing means forcing said first and second transistors in all four branches to operate in the triode region.

19. The analog multiplier of claim 18 wherein said biasing means includes:

four buffer transistors, each buffer transistor having a first, a second and a control terminals, wherein the second terminal of each of said four buffer transistors is respectively connected to the first terminal of a respective one of said first transistors of said four multiplying branches;

a diode-connected transistor having first, second and control terminals, wherein the first terminal and the control terminal of said diode-connected transistor are connected together, the control terminal of said diode-connected transistor being further connected to the control terminals of said four buffer transistors, the first terminal of said diode-connected transistor being connected to a first current source, the second terminal of said diode-connected transistor being connected to a second current source, the second terminal of said diode-connected transistor being further connected to the second terminals of said respective second transistors of said four branches; and the output terminal connected to first and second output nodes, the first terminals of said first transistor of the first branch and of said first transistor of the third multiplying branch being connected together and to said first output node, the first terminals of the respective first transistors of said second and fourth multiplying branches being connected together and to said second output node.

20. The analog multiplier of claim 19, further comprising a subtracting circuit having first and second inputs respectively connected to said first and second output nodes, and an output connected to said output terminal.

21. An analog multiplier comprising:

a first multiplying branch including first and second transistors each having first, second, and control terminals with the second terminal of the first transistor being connected to the first terminal of the second transistor to connect the first and second transistors in series with each other, the control terminals of the first and second transistors respectively receiving first and second input voltages;

a first output node supplying a first electric output quantity proportional to the product of the first and second input voltages; and a diode connected having a first terminal coupled to the first terminal of the first transistor and a second terminal connected to the second terminal of the second transistor, thereby causing the first and second transistors to operate in a triode region.

22. The analog multiplier of claim 21 wherein the diode includes a diode-connected transistor.

23. The analog multiplier of claim 21, further comprising:

a buffer transistor having first, second, and control terminals, the first terminal of the buffer transistor being connected to the output node, the second terminal of the buffer transistor being connected to the first terminal of the first transistor, and the control terminal of the buffer transistor being connected to the first terminal of the diode.

24. The analog multiplier of claim 21, further comprising:

a second multiplying branch including first and second transistors each having first, second, and control terminals with the second terminal of the first transistor of the second multiplying branch being connected to the first terminal of the second transistor of the second multiplying branch to connect the first and second transistors of the second multiplying branch in series with each other, the control terminals of the first and second transistors of the second multiplying branch respectively receiving a third and the second input voltages, the diode's first terminal being coupled to the first terminal of the first transistor of the second multiplying branch and the diode's second terminal being connected to the second terminal of the second transistor of the second multiplying branch, thereby forcing the transistors of the second multiplying branch to operate in the triode region.

25. The analog multiplier of claim 21 wherein the second multiplying branch includes a second output node supplying a second electric output quantity, further comprising a subtracting circuit having first and second inputs respectively connected to the first and second output nodes and an output terminal that supplies a differential electric output quantity that reflects a difference between the first and second electric output quantities.

26. An analog multiplier comprising:

a first multiplying branch including first and second transistors connected in series with each other, the first multiplying branch having first and second input terminals respectively receiving first and second input voltages;

an output terminal supplying an electric output quantity proportional to the product of said first and second input voltages;

a buffer transistor connected in series with the first and second transistors, the buffer transistor coupling the first transistor to the output terminal; and biasing means connected to the first and second transistors by the buffer transistor and forcing said first and second transistors to operate in a triode region.

27. The analog multiplier of claim 26 wherein the biasing means includes a diode with first and second terminals and the buffer transistor has first, second, and control terminals; the first terminal of the diode being connected to the control terminal of the buffer transistor, the second terminal of the diode being connected to the second transistor; the first terminal of the buffer transistor being connected to the output terminal; and the second terminal of the buffer transistor being connected to the first transistor.

28. An analog multiplier comprising:

a first and second transistors connected in series with each other, each having first, second and input terminals, the input terminals of the first and second transistors receiving first and second input voltages respectively;

an output node supplying an electric output proportional to the product of the first and second input voltages;

a control circuit coupled to said transistors to ensure operation of the first and second transistors in a triode region during operation, the control circuit including:

a first buffer transistor having first, second, and control terminals and being connected in series with the first transistor, wherein the first terminal of the buffer transistor is connected to the output node and the second terminal of the buffer transistor is connected to the first terminal of the first transistor; and a diode-connected transistor having first, second, and control terminals, wherein the first terminal and the control terminal of the diode-connected transistor are connected together, the control terminal of the diode-connected transistor being further connected to the control terminal of the buffer transistor, the first terminal of said diode-connected transistor being connected to a first current source, the second terminal of said diode-connected transistor being connected to a second current source, and the second terminal of said diode-connected transistor being further connected to the second terminal of said second transistor.

29. The analog multiplier of claim 28 wherein the first, second, and first buffer transistors are parts of a first multiplying branch and the analog multiplier further includes a second multiplying branch having a second buffer transistor connected in series with third and fourth transistors, the diode-connected transistor being connected to a control terminal of the second buffer transistor and the fourth transistor.

* * * * *